K. FERBER.
DISTRIBUTING AND MIXING APPARATUS.
APPLICATION FILED MAR. 1, 1911.
1,065,793.
Patented June 24, 1913.
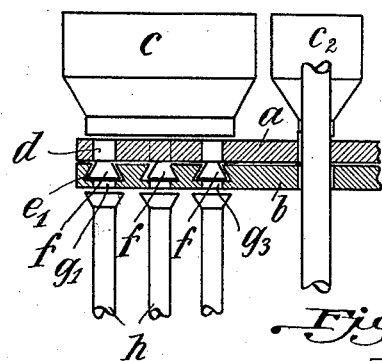
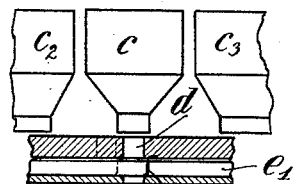
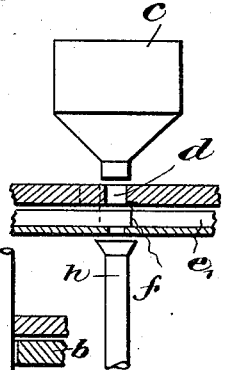
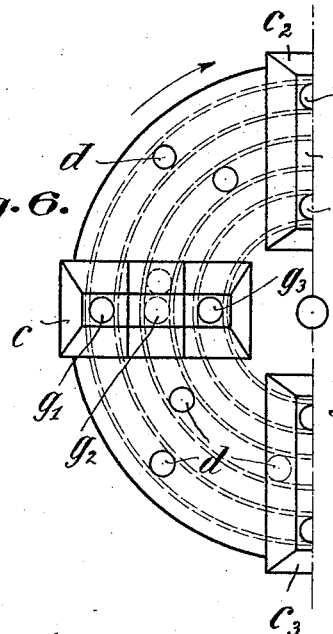
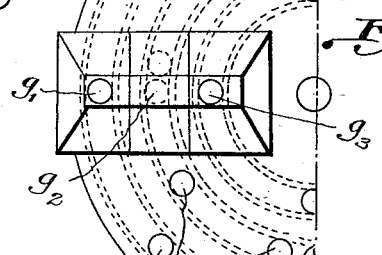

UNITED STATES PATENT OFFICE.

KARL FERBER, OF BERLIN, GERMANY, ASSIGNOR TO SIEMENS-SCHUCKERTWERKE
G. M. B. H., OF BERLIN, GERMANY, A CORPORATION OF GERMANY.

DISTRIBUTING AND MIXING APPARATUS.

1,065,793.  Specification of Letters Patent.  Patented June 24, 1913.

Application filed March 1, 1911. Serial No. 611,666.

*To all whom it may concern:*

Be it known that I, KARL FERBER, a subject of the German Emperor, and residing at Berlin, Germany, have invented certain new and useful Improvements in Distributing and Mixing Apparatus, of which the following is a specification.

My invention relates generally to apparatus for distributing and mixing powders and liquids, and particularly to distributing and mixing apparatus for use in arc-lamps in which powders are burned.

A primary object of my invention is to provide improved distributing and mixing apparatus which automatically supplies the substances to be distributed or mixed in any desired proportions.

Another object is to provide an apparatus of the character described in which both the time of the supply and the relative quantities of the substances can be regulated as desired.

Some illustrative embodiments of my invention are represented by way of example in the accompanying drawing, wherein:—
Figure 1 is a front elevation, partly in section, Fig. 2 is an end elevation, partly in section, Fig. 3 a top plan view showing one form of my apparatus, and Fig. 4 is a front elevation of another embodiment, partly in section; Fig. 5 is an end elevation of the same, partly in section; Fig. 6 is a part top plan view of the same.

Referring firstly to Figs. 1 to 3, my apparatus comprises two superposed disks, *i. e.* a perforated disk $a$ and a distributing disk $b$. The former rotates between the outlet of a feed hopper $c$ and the distributing disk $b$ which is preferably fixed in position. When the disk $a$ rotates and the perforations or holes $d$ therein pass in front of the outlet of the feed hopper, the material to be distributed falls out of the feed hopper, through the perforations or holes $d$ and into the channels $e$ in the disk $b$. Consequently, the material in the hopper is periodically fed into the channels in the distributing disk $b$. The material is here met by blades $f$ which are secured to the underside of the disk $a$ a short distance behind the holes $d$ in the direction of rotation and run with a little play in the channels. The blades push the material to the holes $g$, under which the distributing tubes $h$ or the like are located. In order to provide means whereby substances of different kinds can be distributed in varying proportions into different channels or whereby such materials can be prepared in mixtures embodying varying percentages of the ingredients, any suitable arrangement of the holes in the rotatable disk $a$, can be employed. Preferably, however, I make use of the arrangement shown in Fig. 3 in which the distance intervals between the holes of each series in the disk $a$, is different from the distance intervals of the other series so that different quantities of the materials are drawn from the several hoppers in the battery $c$ of hoppers.

Besides being employed in arc-lamps, my apparatus can be used whenever various substances have to be supplied in various relative quantities and at uneven intervals of time. As mentioned above, not only can any desired relative quantities of the substances which are supplied be fed in unit time, but they can readily be fed at definite times and, in addition, when several compartments are provided in the feed hopper $c$ or when a plurality of feed hoppers are employed, various kinds of substances, *e. g.* dry powders, pastes or liquids, can be supplied. The apparatus is therefore adapted to be used with advantage in making up pharmaceutical preparations, in mixing paints, and in making chemical products.

I claim:—

1. The combination with a hopper, of feed tubes arranged below said hopper, and a plate movably disposed between said hopper and said feed tubes and having a series of openings therein for each of said feed tubes, the number of holes in one of said series being different from that of another series.

2. The combination with a hopper, of feed tubes disposed below said hopper, a distributing plate disposed above said feed tubes and having openings discharging respectively into said feed tubes, and a plate disposed between said hopper and said distributing plate and having a series of openings therein for each of said feed tubes, the number of openings in one of said series being different from that of another series.

3. In distributing and mixing apparatus of the character described the combination with a feed hopper, of a horizontal distributing disk provided with channels and outlets discharging from said channels, a rotatable disk interposed between said hopper and said distributing disk, said rotatable disk being provided with holes arranged in a plurality of series, each of said series being caused by the rotation of said disk to traverse one of said feed tubes, the number of holes in one series being different from the number of holes in another series.

4. In distributing and mixing apparatus of the character described, the combination, with a feed hopper, of a horizontal distributing disk having annular, concentric channels and outlets opening into the channels, a rotatable perforated disk superposed on the former disk, mounted under the outlet of the hopper and having a plurality of perforations arranged in a plurality of circles concentric with the channels in the distributing disk, blades attached to the perforated disk and projecting into the channels, and tubes opening under the outlets in the channels.

In testimony whereof, I have signed my name to this specification in the presence of two witnesses.

KARL FERBER.

Witnesses:
 WALDEMAR HAUPT,
 HENRY HASPER.

Copies of this patent may be obtained for five cents each, by addressing the "Commissioner of Patents, Washington, D. C."